Dec. 26, 1967 H. H. HOLSCHER 3,360,288
JOINT FOR MODULAR TOWER
Filed Jan. 13, 1966
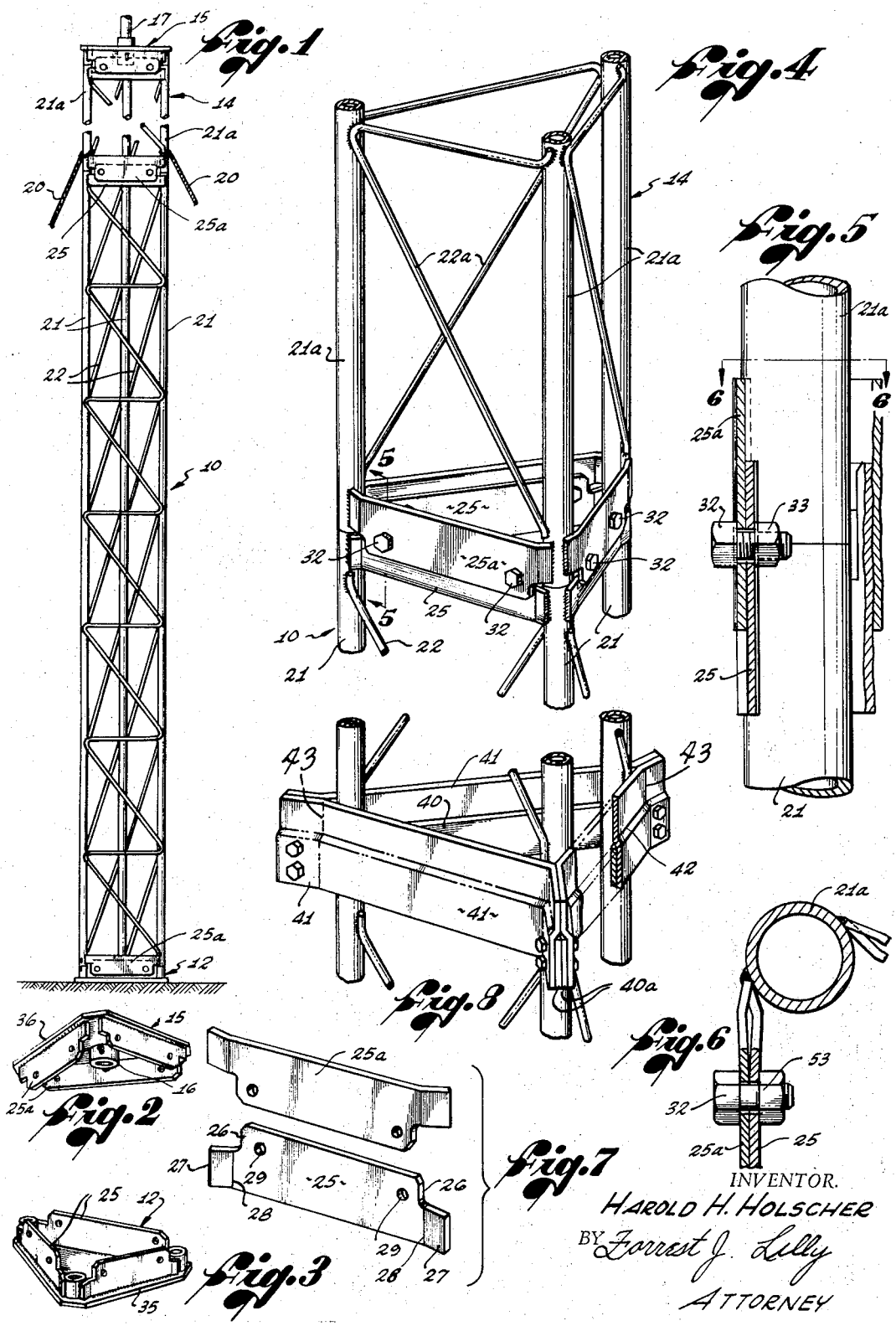
INVENTOR.
HAROLD H. HOLSCHER
BY Forrest J. Lilly
ATTORNEY

United States Patent Office 3,360,288
Patented Dec. 26, 1967

3,360,288
JOINT FOR MODULAR TOWER
Harold H. Holscher, Tulare, Calif., assignor to Tri-Ex Tower Corporation, Visalia, Calif., a corporation of California
Filed Jan. 13, 1966, Ser. No. 520,489
6 Claims. (Cl. 287—189.36)

ABSTRACT OF THE DISCLOSURE

A joint between adjoining sections of a prefabricated modular steel tower for antennae or the like involves vertically disposed, overlapping plates and bolts through the overlapping areas. Especially in towers with tubular legs, the joint maximizes strength as no cuts are made in the legs and the friction between plates resists movement at the joint. In one form the bolts are outboard of the legs thereby increasing the resisting moment of the joint.

---

The present invention relates generally to towers for radio antennae and the like; and more especially to a novel type of joint between prefabricated sections of a tower of the modular type.

Towers are erected for many different purposes, the construction of the tower often being governed by the intended use. Of course, towers carrying high loads or for heavy-duty purposes are generally erected from pre-cut structural steel shapes; but towers for lighter loads can be economically prefabricated. Towers of this type frequently use metal tubing for the legs, since these members must act as stiff compression columns carrying the loads of the tower.

In a modular construction in which a number of sections that have been prefabricated are joined together in the course of erecting the tower, it has been common practice to join any two sections together by bolts, rivets, or other similar fasteners which pass through the tubular legs to join together two lengths of tubing, such lengths commonly overlapping each other for a short distance. This type of joint has been found objectionable in many instances since it usually weakens the legs, particularly when placed in tension. The holes through the tubing necessary to receive the fastener reduce the net effective cross-sectional area of the tubing available to take loads, particularly tension loads, and to this extent necessarily reduce the strength of the leg. Furthermore, the fasteners are ordinarily tightened to such an extent that the tubing may be flattened, and this is particularly true in the case of tubing having a relatively thin wall. The deformation of the tubing causes it to assume an oval shape or some shape other than the original circular cross-section. The result is to reduce in at least one direction the effective radius of the leg, thus reducing the strength of the leg in column action.

For obvious reasons, it is advantageous to provide a joint between adjoining sections of a modular tower which is simple in design, inexpensive to manufacture, and which is rapid and easy to connect, thereby simplifying the job of erecting the tower. At the same time, a satisfactory joint does not sacrifice strength in order to obtain these other desirable characteristics.

Thus it becomes a general object of the present invention to provide a novel type of joint connecting successive sections of a modular tower in such a manner as to maintain the full working strength of the legs of the tower, and to keep the leg sections of successive sections aligned.

More particularly, it is an object of the present invention to devise a novel type of joint between sections of a modular steel tower which avoids passing bolts or other members through the tower legs when the legs are formed of tubing.

It is also an object of the present invention to devise a satisfactory joint which is simple yet has adequate structural strength, is inexpensive to construct and easy to connect.

These objects are achieved according to the present invention in a joint for a modular tower having a plurality of connected sections, each section including a pair of laterally spaced, vertically extending legs in axial alignment with the legs of an adjoining section, such joint including a first plate extending between and fastened to the pair of legs of one section, a second similar plate extending between and fastened to the pair of legs of an adjoining tower section, said plates having mutually overlapping areas, and clamping means bearing against exterior side faces of the overlapping areas. Preferably, the clamping means comprises one or more tension members passing through aligned holes in the overlapping areas and applying sufficient compression to opposite sides of the plates to develop adequate friction at mutually engaging faces of the plates on the two adoining tower sections.

How the above objects and advantages of the present invention, as well as others not specifically mentioned herein, are attained will be more readily apparent from reference to the following description and to the annexed drawing, in which:

FIG. 1 is a side elevation of a prefabricated tower constructed according to the present invention, a portion of the tower being broken away.

FIG. 2 is a bottom perspective view of a terminal plate for the upper end of the tower.

FIG. 3 is a top perspective of a base plate for the lower end of the tower.

FIG. 4 is a fragmentary perspective of the joint between, and portions of, two successive sections of the tower, at an enlarged scale.

FIG. 5 is a further enlarged fragmentary section on line 5—5 of FIG. 4.

FIG. 6 is a horizontal section on line 6—6 of FIG. 5.

FIG. 7 is a perspective view of two plates, detached from the remainder of the tower section, in the relative positions that they occupy prior to complete assembly.

FIG. 8 is a fragmentary perspective view of a joint, illustrating a variational form of the invention.

Referring now to the drawing, FIG. 1 shows therein one complete section 10 of a modular tower. Each section or module may be of any desired length; but typically it has been found in practice that a section 10 feet in length is satisfactory. The section 10 illustrated in FIG. 1 is presumed to be the lowermost section of a tower comprising a plurality of such sections. Tower section 10 rests on base plate 12, shown in greater detail in FIG. 3. The base plate may be anchored to any suitable type of foundation, not illustrated.

Above section 10 is a duplicate section 14 which is not illustrated fully since it is similar in all details to the single section herein described. The tower is surmounted by an upper terminal plate 15, shown in some detail in FIG. 2. Terminal plate 15 is preferably provided with a collar 16 or other suitable means for receiving and holding whip antenna 17 or any other structure to be mounted on top of the tower; but the nature of such structure is not limitative upon the present invention.

The tower is supported laterally by a plurality of guys 20 attached in any suitable manner to the tower at or near the top thereof, usually to the legs, the lower end of the guys being attached to suitable anchor means. Guys may also be attached to the tower at lower points intermediate the length of the tower.

The joint between the tower sections 10 and 14 is shown particularly in FIGS. 4 and 5 from which details of the construction of the entire tower section 10 will become evident.

It will be seen that a tower section comprises a plurality of laterally spaced legs 21, either tubular or solid, which have their axes parallel and vertical when the tower is erected, as in FIG. 1. There are preferably three tubular (or solid) legs 21 as shown forming an equilateral triangle; but it is within the scope of the invention to use a larger number of legs for the tower, if desired.

Legs 21 of the tower are maintained positioned with respect to each other by a latticework 22 which is typically and preferably a solid rod formed into a plurality of W, X, or Z-shapes and welded, or otherwise attached, to legs 21. Z-shapes are shown. In the arrangement illustrated, the legs 21 form the two chords of a vertical truss while latticework 22 provides the web structure interconnecting the truss chords.

The adjoining tower section 14 is formed in the same manner with three legs 21a joined by latticework 22a, the legs 21a being axially aligned and resting upon the legs 21 of the tower section immediately beneath.

The joint between the two tower sections comprises a plurality of plates 25 on section 10 and similar plates 25a on section 14. Each plate 25 extends between and is fastened by welding at its ends to a pair of legs 21 at the upper end of section 10, and all other sections. There being three such sides to the tower section, there are three plates 25, as illustrated. A plate 25 is formed from a flat sheet by cutting a blank of the proper overall dimensions, notching the corners at 26 to form a pair of tabs 27 at opposite ends of the plate and then bending the tabs slightly at 28 with respect to that portion of the plate between the tabs, as shown in FIG. 7. The bend at lines 28 is for the purpose of offsetting the central portion of the plate sufficiently that two plates can overlap when the tower legs 21 and 21a are coaxial, as will be further described; and consequently the angle of bending is rather small. In practice, the bend is sufficient to offset the central portion about the thickness of the plate used. This amount is more than the theoretical minimum of half the plate thickness but is preferred in order to provide sufficient tolerance between sections for quick and easy assembly. A pair of holes 29 are then formed by punching or drilling the plate, the holes preferably being located near the ends of the plate. The lower end of tower section 14, as well as the lower end of every other tower section, is provided with similar plates 25a which are duplicates in all respects of plates 25. All plates are preferably made as duplicates of each other for ease and simplicity of manufacture since all plates can then be made with the same die. By reversing plates 25 when they are placed on the lower end of a section 14, they become the plates 25a; and the direction of the offset of the central portion of the plates formed by bending along lines 28 causes the central portions to be offset sufficiently to overlap as shown in FIGS. 4 and 5 when two adjoining tower sections are brought into abutting relationship in the erection of the tower. However, in the broader aspect of the invention, plates 25 and 25a do not need to be duplicates of each other.

When the tower section is in the vertical position in a tower, plates 25 and 25a extend horizontally between vertically extending tower legs 21. Plates 25 and 25a lie generally in vertical planes so that the action of the two plates is to form a horizontal beam of substantial depth compared to its width. The cooperation of the two plates together at a joint forms a beam of twice the horizontal width of a single plate.

The tower is erected by placing the lower end of tower section 14 on the upper end of tower section 10, as illustrated in FIG. 4. The legs of the two sections are abutting with the load from the upper tower section transmitted directly to the legs of the tower section beneath. The plates 25a are outwardly offset from plates 25, bringing the holes 29 in the two sets of plates into axial alignment to receive suitable tension members passing through the aligned holes 29. These tension members are typically bolts 32 as shown; but may be rivets or any other suitable type of fastener.

Bolts 32 are provided with nuts 33 that together form clamping means bearing against the outside or exterior side faces of the overlapping areas on two plates 25 and 25a. The lateral pressure on the exterior sides of the plates brings the interior faces of the overlapping areas of the plates in mutual contact, the pressure of the bolt head and nut developing substantial frictional engagement between the two plates 25 and 25a at their mutually engaging surfaces.

Holes 29 are preferably made somewhat larger than the maximum diameter of bolts 32. Typically a ⅜ inch bolt at 32 is inserted in a hole having a $^{13}/_{32}$ inch diameter. The clearance between the bolt and the sides of the hole is sufficient that when the tower sections are assembled in the manner described, the bolts in the joints are initially in tension only.

Using high strength steel for bolts 32, a ⅜ inch bolt has a sufficiently large root area that it can be safely tightened to develop approximately 12,000 pounds tension. If it is assumed that the coefficient of friction between the two plates 25 and 25a is .4, then the two plates develop a resistance to relative movement of approximately 4,800 pounds. There being two bolts adjacent each leg of the tower, a vertical force of approximately 9,600 pounds is required before any separation occurs between two abutting legs of two adjoining tower sections. This is sufficient to resist all ordinary and normal wind or other loads on the tower. Actually, in practice, a somewhat greater separating force is required because the dead load on the legs in compression, consisting of the weight of the tower sections above any joint and the downward components of guy lines 20 above a given joint, are forces maintaining two leg sections in contact with each other.

However, should lateral loading on the tower from wind become sufficient to develop a net upward force at the joint sufficient to cause relative movement between two plates 25 and 25a, such movement of relatively small magnitude causes bolt 32 to engage the sides of holes 29 in the two plates, thereby placing the bolt in shear. This added loading on the bolt results in added resistance to movement between the tower sections and provides a reserve strength in the joint when design loadings are based only on the frictional strength of the engagement between two plates 25 and 25a.

Terminals 12 and 15 each comprise a horizontal plate to which there is connected a plurality of joint plates similar to those described. Thus joint plates similar to plates 25 are attached to horizontal plate 35 to form the lower terminal 12 and joint plates similar to plates 25a are attached to plate 36 to form upper terminal 15. Joints at the ends of the tower are thus the same as described.

It is within the scope of the present invention to incorporate various changes in the precise size, shape and arrangement of the components of the joint. For example, a washer or bearing plate having a roughened surface may be interposed between the two plates 25 and 25a at each of bolts 32 for the purpose of increasing the magnitude of the friction forces resisting relative movement of the two plates.

Also the shape of the plates may be changed somewhat. For example, it will be evident that the plates could be offset along a longitudinally extending line connecting the bases of the two notches 26, such line being horizontal when the tower is erected. Likewise, the invention is not limited to the inboard location shown for holes 29 and bolts 32.

Both of these modifications have been incorporated in the embodiment illustrated in FIG. 8, in which the plates are not duplicates of each other. Plate 40 at the upper end of each section is the narrower of the two, lower plate 41 being wider and bent or crimped at 42 along a longitudinal line to provide for overlapping the two plates of each joint. Both plates are longer than the distance between the two legs to which they are attached by welding in order to extend outwardly beyond the legs at both ends of the plates.

The plates are both bent along vertical lines 43 at their ends to produce end wing sections 40a and 41a that bring plates from two sides of the tower into contact along a vertical plane that substantially bisects the exterior angle between two sides of the tower. As a result, when holes in the plates are located outboard of the legs in the bent end wing sections and are aligned to receive a bolt 32, a bolt may pass through and connect four plates, as shown in FIG. 8. The outboard location of the bolts has the advantage that the lever arm resisting a moment rocking one tower section about the bottom of a leg of that tower section is greater than when the bolts are inboard or between the legs, as in FIG. 4.

Accordingly, it will be understood that the foregoing description is considered as being illustrative of, rather than limitative upon, the invention as defined by the appended claims.

I claim:

1. A joint construction between sections of a modular tower having a plurality of connected sections each including a pair of laterally spaced, vertically extending legs in axial alignment with the respective legs of an adjoining section, comprising:
   a first plate extending between and fastened at horizontally spaced positions to a pair of vertically extending legs on one section, said first plate having a substantially flat central section and end sections angularly disposed relative to said central section;
   a second plate extending between and fastened at horizontally spaced positions to a pair of vertically extending legs on an adjoining section, said second plate also having a substantially flat central section and end sections angularly disposed relative to the central section of the second plate;
   the two plates having at least portions thereof that are horizontally offset suffiicently with respect to each other that areas on vertical opposing side faces of the two plates are overlapping; and
   clamping means bearing against exterior side faces of the plates and passing through the plates within said overlapping area.

2. A joint construction as in claim 1 in which the clamping means include
   aligned holes in the overlapping areas;
   and a tension member passing through the holes, with clearance, whereby the tension member is initially loaded in tension only.

3. A joint construction as in claim 1 in which the plates are notched at each end to form tabs, said tabs being welded to the legs; and the plates each being bent at the base of each tab to offset the portion of the plate between the tabs with respect to the corresponding portion of the other plate.

4. A joint construction as in claim 1 in which both plates extend outwardly beyond the legs to which the respective plates are attached, each plate having an end wing section lying substantially parallel to a plane bisecting the exterior angle between two adjoining sides of the tower, and the clamping means are located in the end wing sections outwardly of the tower legs, whereby the lever arms of the resisting moments created by said clamping means are increased.

5. A joint construction as in claim 4 in which one plate is wider than the other and the wider plate is horizontally offset along a median longitudinal axis, the offset portion overlapping the other plate.

6. A joint construction between sections of a modular tower having a plurality of connected sections of which each section includes laterally spaced, vertically extending legs in axial alignment with the respective legs of an adjoining section, comprising:
   a first pair of plates of which each plate extends between and is fastened at horizontally spaced positions to a pair of vertically extending legs on one section, the pairs of legs having one leg in common and each plate of said first pair having a substantially flat central section and end sections angularly disposed relative to said central section;
   a second pair of plates of which each plate extends between and is fastened at horizontally spaced positions to a pair of vertically extending legs on an adjoining section, the last mentioned pairs of legs having one leg in common and each plate of said second pair also having a substantially flat central section and end sections angularly disposed relative to the central section of the respective plates of the second pair;
   the two plates of the second pair being sufficiently horizontally offset along a median longitudinal axis and with respect to plates of the first pair that areas on vertical opposing side faces of two plates on corresponding pairs of legs are overlapping and adjacent end sections of the two pairs of plates extend outwardly beyond the legs in side-by-side relation substantially parallel to a plane bisecting the exterior angle of the tower; and
   clamping means bearing against exterior side faces of the plates and passing through end sections of four plates within said overlapping area.

References Cited

UNITED STATES PATENTS

| | | | |
|---|---|---|---|
| 1,666,413 | 4/1928 | Foster | 52—638 |
| 1,728,164 | 9/1929 | Zureck | 52—301 |
| 2,828,841 | 4/1958 | Weeks | 52—637 |

EDWARD C. ALLEN, *Primary Examiner.*